United States Patent

Ballu

[11] Patent Number: 5,125,578
[45] Date of Patent: Jun. 30, 1992

[54] RAPID-CHANGE NOZZLE-SUPPORT DEVICE

[75] Inventor: Patrick Ballu, Reims, France
[73] Assignee: Tecnoma, Epernay, France
[21] Appl. No.: 623,165
[22] Filed: Dec. 6, 1990

[30] Foreign Application Priority Data

Dec. 11, 1989 [FR] France .................. 8916326

[51] Int. Cl.⁵ .................................. B05B 1/16
[52] U.S. Cl. .......................... 239/394; 239/600
[58] Field of Search .......... 239/393, 394, 104, 120, 239/570, 571, 576, 271, 272, 500, 600; 251/61.1

[56] References Cited

U.S. PATENT DOCUMENTS

| | | | |
|---|---|---|---|
| 1,554,521 | 9/1925 | Reece | 239/394 |
| 3,009,655 | 11/1961 | Palmer | 239/600 |
| 3,385,525 | 5/1968 | Jacobs | 239/394 |
| 3,856,208 | 12/1974 | Naftaly | 239/272 |
| 3,920,037 | 11/1975 | Hoff et al. | 239/271 |
| 3,954,223 | 5/1976 | Wichman et al. | 239/570 |
| 4,058,260 | 11/1977 | Lestradet | 239/394 |
| 4,121,771 | 10/1978 | Hendrickson | 239/272 |
| 4,527,745 | 7/1985 | Butterfield et al. | 239/600 |
| 4,715,578 | 12/1987 | Seltzer | 251/61.1 |
| 4,753,570 | 6/1988 | Jarvis | 251/61.1 |

*Primary Examiner*—Andres Kashnikow
*Assistant Examiner*—Christopher G. Trainor
*Attorney, Agent, or Firm*—Watson, Cole, Grindle & Watson

[57] ABSTRACT

Device for spraying liquids comprising a body (1A, 1B) having an inlet passage (2) which can be connected to a feed line (2); a chamber (3) provided in the body and communicating with the inlet passage; an outlet passage (8) which communicates with the chamber (3); a bearing surface surrounding the body portion which contains the chamber (3) and in which the outlet passage emerges; and a nozzle-carrier component (12) mounted rotatably on the bearing surface, carrying at least two nozzles (13) and having orifices disposed in order to place a specific nozzle in communication with the said outlet passage for a suitable position of the said nozzle-carrier component.

9 Claims, 2 Drawing Sheets

RAPID-CHANGE NOZZLE-SUPPORT DEVICE

PRIOR ART

The present invention relates to a nozzle-support device intended to be employed in a liquid-spraying installation, for which it is necessary to be able to have available nozzles of several forms or dimensions which can be interchanged almost instantaneously.

Nozzle supports of this type customarily comprise a body having an inlet passage and at least one outlet passage, which can communicate with one another, and on which is rotatably mounted a rotating component which can simultaneously carry at least two nozzles, and means for immobilizing the rotating component at will in specific positions relative to the body, these positions being such that, in at least some of them, one of the nozzles is connected to an outlet passage of the body.

The design is such that a simple rotary movement of the rotating component relative to the body makes it possible to interchange one nozzle with another.

Moreover, anti-drip devices are known, which are associated with non-interchangeable nozzle devices, and they are used in the following way. In a large installation, particularly an installation provided with a large number of different nozzles, the control of the feed to the nozzles is centralized and is achieved by means of valves, for example electrically controlled valves, located on a feed line at a certain distance from the nozzle. When the valve is closed, the volume of liquid remaining between the valve and the nozzle flows out via the latter in an undesired manner. The anti-drip device operates as a shutter located as close as possible to the nozzle and which closes the connection between the feed line and the nozzle as soon as the pressure of the liquid drops in this line, so that only the small volume of liquid remaining between the anti-drip device and the nozzle will flow out via the latter.

It has been proposed (see U.S. Pat. No. 4,058,260, Maurice LESTRADET) to combine a multiple-nozzle support with an anti-drip device. The apparatus described comprises a body in which an inner channel emerges, on the one hand, in the chamber of an anti-drip device and, on the other hand, after a right-angled bend, in a cylindrical surface which forms a bearing for the multiple-nozzle support. In its central portion, the body carries means for fastening it to a supply line, and a second inner channel, parallel to the first, is used to connect the supply line to the chamber of the anti-drip device.

This structure has the disadvantage of a relatively large distance, virtually equal to the length of the body, between the anti-drip device and the nozzles, so that a relatively large volume of product flows out each time operation is interrupted.

The assignee of the present patent application has marketed, under the "TRIMATIC" trade mark, another apparatus in which the bearing carrying the nozzle support is carried by the cover which forms the chamber of the anti-drip device. Obviously, an outlet line passes through this cover. This arrangement has made it possible to appreciably shorten the distance between the anti-drip device and the nozzles, but it involves complicated forms for the anti-drip device and its chamber since the supply line is located opposite the cover and thus opposite the outlet line.

The present invention aims to provide an apparatus of the same type as those just described, and in which the distance between the anti-drip device and the nozzles is as small as possible, with simple forms and a robust and cheap construction.

SUMMARY OF THE INVENTION

In order to obtain this result, the invention provides a nozzle-support device comprising, grouped in a dismantlable assembly:

a body which has an inlet passage which, on the one hand, can be connected to a feed line, and on the other hand, emerges in a chamber, an anti-drip device placed in the chamber and comprising a movable or deformable component capable of interrupting the circulation between the said chamber and an outlet passage, and means for displacing said movable or deformable component, a nozzle-carrier component, mounted rotatably on a bearing surface possessed by the body, carrying at least two nozzles and having orifices which are disposed in order to place a specific nozzle in communication with the outlet passage for a suitable position of said nozzle-carrier component, a particular feature of this device being that the bearing surface surrounds the portion of the body which contains the chamber where the anti-drip device is placed.

The device preferably comprises a cover which, with the body, delimits the chamber and prevents the anti-drip device being displaced axially, which would separate it from the body, and the bearing surface is disposed in such a manner that the nozzle-carrier component is held by the cover, if the body is made as a single component, or by the portion of the body which carries the cover, if the body is made in two portions.

Advantageously in this case, the chamber which contains the anti-drip device is symmetrical in terms of revolution and the nozzle-carrier component is essentially located between two planes perpendicular to the axis of the chamber and of which one crosses the feed line or the chamber, and of which the other crosses the chamber or the cover.

Also preferably, it being possible for this aspect to be combined with the above preferred aspects, a wall of the body whose inner face defines the chamber constitutes, at least partially, via its outer face, the bearing surface on which the nozzle-carrier component is mounted.

It will be understood that, according to the invention, the bearing carrying the nozzle-carrier component surrounds the chamber of the anti-drip device, which in real terms reduces as much as possible the distance between the latter and the nozzles while making it possible to achieve extremely simple forms, as will be seen in the following examples. This is a sign of robustness and cheapness.

In agricultural spraying apparatuses, the nozzle supports are currently fastened on a generally horizontal feed line by means of screwed connections of conventional type. Mounting and dismantling are tiresome operations so that, when a campaign is completed, the user tends to leave them mounted. This practice has the drawback of giving rise to corrosion, clogging, leaks, bursting due to freezing, etc. after an extended period out of service.

Rapid connection means are advantageously provided for mounting the device on a feed line having a lateral orifice and simultaneously connecting the inlet passage to the inside of the feed line. The inlet passage is preferably parallel to the axis of rotation of the nozzle-carrier component and is provided in order to be connected perpendicularly to the feed line.

BRIEF DESCRIPTION OF THE DRAWINGS

The invention will now be presented in a more detailed manner with the aid of practical examples illustrated with the drawings, among which.

DETAILED DESCRIPTION OF EMBODIMENTS ACCORDING TO THE INVENTION

Figure 1:
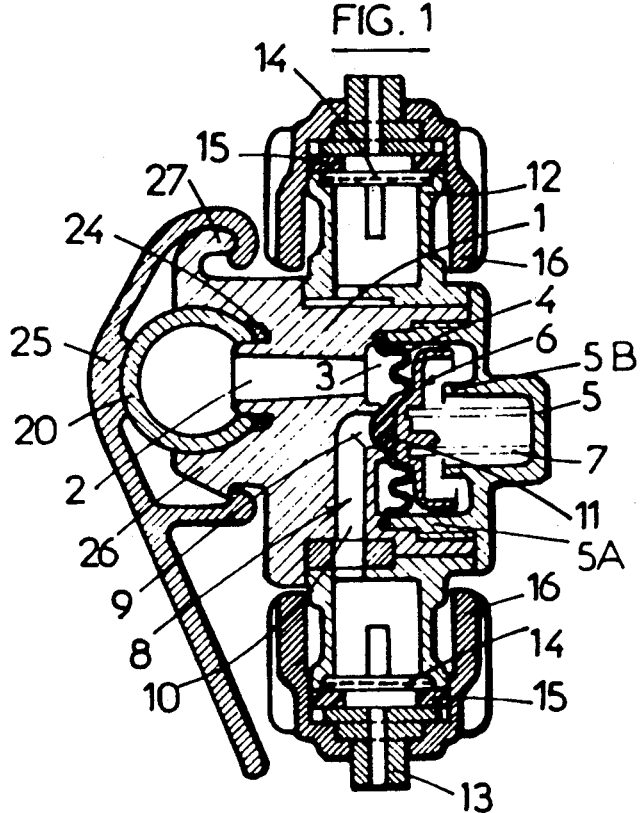
FIG. 1 is a sectional view of a nozzle-support device according to the invention.

The nozzle carrier in FIG. 1 comprises a body 1 which has an inlet passage 2 and which emerges, on the one hand, on the outside and, on the other hand, in the chamber 3 of the anti-drip device. This chamber 3, of generally cylindrical form, with an axis parallel to that of the inlet passage 2 is defined, on the side opposite this inlet passage, by a deformable membrane 4 which is held by a cover 5 screwed on to the body 1. The cover 5 comprises a ring 5A and the membrane 4 is gripped between the edge of this ring and a shoulder of the body over the entire periphery of this membrane. A thrust component 6 bears on the central portion of the membrane 4. This thrust component is loaded by a helical spring 7 which bears, on the one hand, on the thrust component 6 and, on the other, on the central portion of the cover 5 so as to separate the membrane 4 from this cover. An annular portion 5B of the cover serves as a housing for the spring 7 and at the same time constitutes a stop which limits the displacement of the thrust component 6 and, consequently, of the membrane 4 in the direction of the opening of the anti-drip device. The outlet passage 8 comprises a first portion 9 directed according to the axis of the chamber 3 and a second portion 10 perpendicular to the axis of this chamber. In the closed position, shown in FIG. 1, the thickened central portion 11 of the membrane 4 comes to bear against the end of the portion 9 of the outlet passage and interrupts communication of this passage with the chamber 3.

The body 1 has a cylindrical surface which serves as a bearing for the nozzle-carrier component 12 which can rotate about the axis of this cylindrical surface. This axis is coincident with the axis of the chamber 3 of the anti-drip device. The nozzle-carrier component 12 is held in place by an extension of the cover 5 on one side and by a shoulder of the body 1, this shoulder marking the limit of the cylindrical surface forming a bearing. The second portion 10 of the outlet passage emerges in this cylindrical surface. The nozzle-carrier component 12 comprises a certain number of passages on which nozzles 13 may be mounted, with interposition of a filter 14 and a joint 15, by virtue of threaded caps 16 provided with an internal thread which interacts with an external thread of the nozzle-carrier component.

It will be noted that dismantling the nozzle carrier is extremely easy. In fact, removal of the cover 5 simultaneously releases the membrane 4, the thrust component 6, the spring 7 and the nozzle-carrier component 12 so that the body remains alone.

The device is connected to a feed line in the following manner: a feed hose 20 is pierced with a hole, with an axis perpendicular to that of the hose. The edges of the hole penetrate into a groove 24 in the body, which surrounds the inlet orifice of the inlet passage and which is provided with an O-ring. A resilient fastening component 25 bears on two hook-shaped projections 26, 27 provided on either side of the inlet passage 2, and clamps the hose 20 against the O-ring provided in the slot 24.

Figure 2:
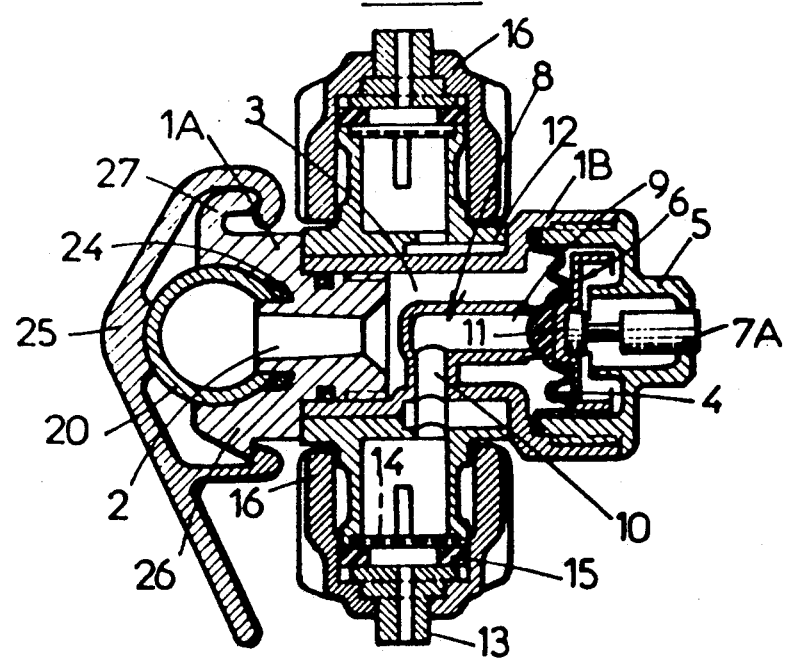
FIG. 2 is a cross section similar to that in FIG. 1, showing an alternative embodiment of this device.

The nozzle carrier in FIG. 2 differs from that in FIG. 1 essentially in the structure of the body. This is formed from two portions 1A, 1B connected in a leaktight manner. The portion 1A of the body comprises the inlet passage 2, with the groove 24 and the hook-shaped projections 26, 27 for fastening on the feed hose, this fastening being achieved in the same manner as in FIG. 1. The body portion 1B is screwed on to the portion 1A; it carries the cover 5, of similar form to that of the cover in FIG. 1, apart from the fact that it does not have any extension to hold the nozzle-carrier component 12, the latter being held by a shoulder of the portion 1B itself. The outlet passage 8 is carried by the body portion 1B; it is also in two right-angled portions 9 and 10. A difference from FIG. 1 consists in the fact that the axial portion 9 of the outlet passage 8 is coaxial with the inlet passage 2. The result of this arrangement is that the nozzle-carrier component 12 rotates coaxially with the fastening of the assembly on the feed line 20, which reduces stress on this line when a nozzle is changed. Moreover, it has been possible to shorten the non-coaxial portion 10 of the outlet passage 8, which further reduces the volume of liquid capable of flowing out via a nozzle when the anti-drip device is closed. The diameter of the nozzle-carrier component 12 is smaller than that in FIG. 1, which reduces the spatial requirement of the device in the radial direction. On the other hand, this spatial requirement is slightly increased in the axial direction, due to the fact that the inlet passage 2 and outlet passage 8 emerge one behind the other in the chamber 3 of the anti-drip device instead of emerging side by side therein.

It will be noted in FIG. 2 that the spring 7 in FIG. 1 is replaced by a small hydraulic or pneumatic jack (7A); this forms a control which may be controlled at will or automatically.

Figure 3:
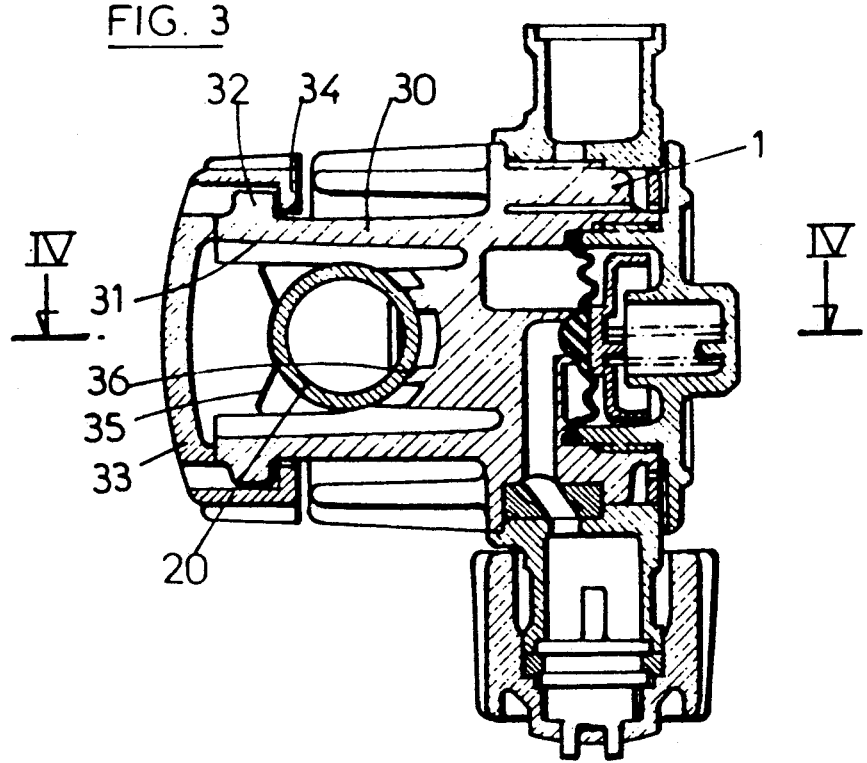
FIG. 3 is a cross section, similar to that in FIGS. 1 and 2, of a further alternative embodiment of the device.
Figure 4:
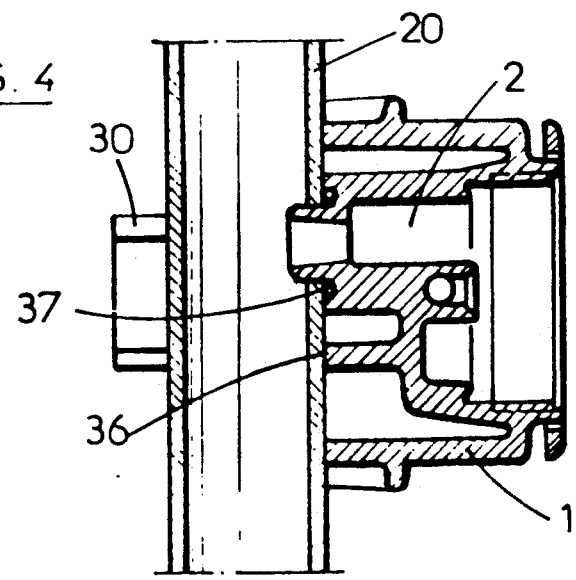
FIG. 4 is a cross section, along the line IV-IV in FIG. 3, of the nozzle-carrier body.

FIGS. 3 and 4 show an alternative embodiment of the device in FIG. 1, which differs from the latter, internally, in that the inlet passage 2 is offset relative to the axis not in a direction perpendicular to the feed hose 20 but in a direction parallel therewith, which reduces the spatial requirement in the vertical direction, assuming that the hose 20 is horizontal, which is the general case of sprayers used in agriculture.

Moreover, the method of fastening the body 1 on the hose 20 is different:

a cylindrical extension 30, coaxial with the inlet passage 2 and having a large radial notch 31, in which the feed hose 20 can engage, is provided on the body 1. Short peripheral ribs 32, perpendicular to the axis, are provided on the outside of the extension 30. A component 33 in the form of a stopper covers the extension 30. It has inner ribs 34 which, with the ribs 32, form a bayonet assembly of the conventional type. When the bayonet assembly is effected, a surface forming a cam 35, carried by the component 33, presses the hose 20 against a shoulder 36 surrounding the end of the inlet passage 2. A joint 37 ensures leaktightness. This arrangement is more reliable than that in FIGS. 1 and 2 in preventing an undesired dismantling due to a wrong maneuver or due to fatigue of the fastening component 25. It is also possible to envisage the component 33 being mounted on the extension 30 by means of a coarse-pitch screw.

I claim:

1. Nozzle-carrier device, grouped in a dismantlable assembly comprising:
   a body having an inlet passage which, on the one hand, can be connected to a feed line and, on the other hand, emerged in a chamber,
   an anti-drip device placed in the chamber and comprising a movable component capable of interrupting circulation between said chamber and an outlet passage of said body, and means for displacing said movable component, and
   a nozzle-carrier component carrying at least two nozzles and having orifices which are disposed in order to place one of said at least two nozzles in communication with the outlet passage of said body, said nozzle carrier component being mounted rotatably on a bearing surface which forms part of the body and which surrounds a portion of the body which contains said chamber and thus surrounds the anti-drip device.

2. Nozzle-carrier device according to claim 1, also comprising a cover which, with the body, delimits the chamber and prevents the anti-drip device from being displaced axially, which would separate it from the body, and wherein the bearing surface is disposed in such a manner that the nozzle-carrier component is held by the cover, and the body is made as a single component.

3. Nozzle-carrier device according to claim 2, wherein the chamber which contains the anti-drip device is symmetrical about a longitudinal axis about which the nozzle carrier component rotates and the nozzle-carrier component is located essentially between two planes perpendicular to the axis of the chamber, wherein one of said planes crosses the feed line, and the other of said planes crosses the cover.

4. Nozzle-carrier device according to claim 1, wherein a wall of the body has an inner face which defines the chamber and said wall constitutes, at least partially, via an outer face of said wall, the bearing surface on which the nozzle-carrier component is mounted.

5. Nozzle-carrier device according to claim 1, also comprising rapid connection means for mounting the device on said feed line through a lateral orifice in said feed line and simultaneously connecting the inlet passage to the inside of said feed line.

6. Nozzle-carrier device according to claim 5, wherein the inlet passage is parallel to the axis of rotation of the nozzle-carrier component and connected perpendicularly to the feed line.

7. Nozzle-carrier device according to claim 5, wherein edges of said lateral orifice of the line penetrate into a groove in the body which surrounds an inlet orifice of the inlet passage and is provided with an O-ring, and said rapid connection means comprises a resilient fastening component bearing on two hook-shaped projections provided on either side of the inlet passage to clamp the line against said O-ring.

8. Nozzle-carrier device according to claim 5, wherein the body carries a cylindrical extension coaxial with the inlet passage and having a radial notch in which the line can engage, and a component in the form of a stopper covers the extension and is held on said extension by a bayonet assembly, the component also carrying a surface forming a cam which presses the line against a shoulder surrounding the end of the inlet passage.

9. Nozzle-carrier device according to claim 1, also comprising a cover which, with the body, delimits the chamber and prevents the anti-drip device from being displaced axially, which would separate it from the body, and wherein the bearing surface is disposed in such a manner that the nozzle-carrier component is held by the portion of the body which carries the cover, and the body is made in two portions.

* * * * *